(12) United States Patent
Xia et al.

(10) Patent No.: US 11,237,844 B2
(45) Date of Patent: Feb. 1, 2022

(54) METHOD AND APPARATUS FOR LOADING KERNEL MODULE

(71) Applicant: Baidu Online Network Technology (Beijing) Co., Ltd., Beijing (CN)

(72) Inventors: Liangzhao Xia, Beijing (CN); Chenfu Bao, Beijing (CN); Yulong Zhang, Beijing (CN); Tao Wei, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 154 days.

(21) Appl. No.: 16/353,772

(22) Filed: Mar. 14, 2019

(65) Prior Publication Data

US 2019/0213014 A1 Jul. 11, 2019

Related U.S. Application Data

(63) Continuation of application No. PCT/CN2017/100473, filed on Sep. 5, 2017.

(30) Foreign Application Priority Data

Feb. 22, 2017 (CN) .......................... 201710096226.X (51) Int. Cl.
*G06F 9/46* (2006.01)
*G06F 9/445* (2018.01)
(Continued)

(52) U.S. Cl.
CPC ............ *G06F 9/445* (2013.01); *G06F 9/4401* (2013.01); *G06F 21/572* (2013.01)

(58) Field of Classification Search
CPC ....... G06F 9/445; G06F 9/4401; G06F 21/572
See application file for complete search history.

(56) References Cited

U.S. PATENT DOCUMENTS 8,245,243 B1 * 8/2012 Neuendorffer ........ G06F 13/102
719/321
2004/0221275 A1 11/2004 Handal
(Continued)

FOREIGN PATENT DOCUMENTS

| CN | 105183530 A | 12/2015 |
| CN | 105787352 A | 7/2016 |

(Continued)

OTHER PUBLICATIONS

Memorandum About Vermagic and Modversions, retrieved from https://enakai00.hatenablog.com/entry/20110509/1304910773, posted May 9, 2011, 6 pages (with partial English translation).

(Continued)

*Primary Examiner* — Tammy E Lee
(74) *Attorney, Agent, or Firm* — Seed IP Law Group LLP (57) ABSTRACT

The present disclosure discloses a method and apparatus for loading a kernel module. A specific embodiment of the method comprises: detecting an instruction for loading a to-be-loaded kernel module into a target kernel; determining, in response to detecting the instruction, whether identifier information is included in the to-be-loaded kernel module, the identifier information being used to represent loading the to-be-loaded kernel module into the target kernel; and loading, in response to determining the identifier information being included in the to-be-loaded kernel module, the to-be-loaded kernel module into the target kernel. This embodiment improves the applicability of the to-be-loaded kernel module.

9 Claims, 4 Drawing Sheets

(51) Int. Cl.
*G06F 21/57* (2013.01)
*G06F 9/4401* (2018.01)

(56) References Cited

U.S. PATENT DOCUMENTS

2007/0220343 A1* 9/2007 Harres ................ G06F 11/0751
714/36
2010/0162229 A1* 6/2010 Tsuk .................. G06F 9/44526
717/175
2012/0011501 A1* 1/2012 Filali-Adib ......... G06F 9/45558
718/1

FOREIGN PATENT DOCUMENTS

| CN | 105893085 A | 8/2016 |
| CN | 106815031 A | 6/2017 |
| KR | 10-2004-0099439 A | 11/2004 |
| WO | 2015/078294 A1 | 6/2015 |
| WO | 2016/095489 A1 | 6/2016 |

OTHER PUBLICATIONS

International Search Report, dated Dec. 19, 2017, for PCT/CN2017/100473, 2 pages.
Lee, Jong-Seok, et al., Energy-efficient Run-time Detection of Malware-infected Executables and Dynamic Libraries on Mobile Devices, 2009 Software Technologies for Future Dependable Distributed Systems, 2009, 7 pages.

* cited by examiner

METHOD AND APPARATUS FOR LOADING KERNEL MODULE

CROSS-REFERENCE TO RELATED APPLICATION

This application is a continuation of International Application No. PCT/CN2017/100473, which claims the priority of Chinese Application No. 201710096226.X, filed on Feb. 22, 2017. Both of the aforementioned applications are incorporated herein by reference in its entirety.

TECHNICAL FIELD

The present disclosure relates to the field of computer technology, specifically to the field of operating system kernel technology, and more specifically to a method and apparatus for loading a kernel module.

BACKGROUND

At present, for the purpose that a kernel module may be run in a kernel program, it is generally required to generate the kernel module containing the source code of a kernel. Therefore, the existing kernel module loading method generally refers to that, according to the source code of the kernel and parameters (e.g., a kernel version, a kernel symbol, and a CRC (cyclic redundancy check)) required to be verified when the kernel module is loaded, a recompilation or remodification is performed on the kernel module to pass the verification mechanism for the kernel, to load the kernel module into the kernel.

The kernel module can only be loaded onto the kernel corresponding to the source code on which the compiling of the kernel module is based. Thus, when there are various versions of kernels in the same operating system, multiple recompilations or remodifications generally need to be performed on the kernel module, for being applicable to different versions of kernels.

SUMMARY

The purpose of the present disclosure is to provide an improved method and apparatus for loading a kernel module, to solve the technical problems mentioned in the foregoing Background section.

In a first aspect, the present disclosure provides a method for loading a kernel module. The method includes: detecting an instruction for loading a to-be-loaded kernel module into a target kernel; determining, in response to detecting the instruction, whether identifier information is included in the to-be-loaded kernel module, the identifier information being used to represent loading the to-be-loaded kernel module into the target kernel; and loading, in response to determining the identifier information being included in the to-be-loaded kernel module, the to-be-loaded kernel module into the target kernel.

In some embodiments, the loading, in response to determining the identifier information being included in the to-be-loaded kernel module, the to-be-loaded kernel module into the target kernel includes: performing, in response to determining the identifier information being included in the to-be-loaded kernel module, a security verification on the identifier information; and loading the to-be-loaded kernel module into the target kernel if the identifier information passes the security verification.

In some embodiments, the method further includes generating the identifier information in a kernel module. The generating the identifier information in a kernel module includes: acquiring the kernel module, and determining whether the kernel module satisfies a preset condition; and generating, in response to determining the kernel module satisfying the preset condition, the identifier information in the kernel module by a default method.

In some embodiments, the preset condition includes compatibility between the kernel module and a kernel to which the kernel module is to be loaded.

In some embodiments, the method further includes: performing, in response to determining the identifier information being excluded in the to-be-loaded kernel module, a loading verification on the to-be-loaded kernel module; and loading the to-be-loaded kernel module into the target kernel if the to-be-loaded kernel module passes the loading verification.

In a second aspect, the present disclosure provides an apparatus for loading a kernel module. The apparatus includes: a detecting unit, configured to detect an instruction for loading a to-be-loaded kernel module into a target kernel; an identifier information determining unit, configured to determine, in response to detecting the instruction, whether identifier information is included in the to-be-loaded kernel module, the identifier information being used to represent loading the to-be-loaded kernel module into the target kernel; and a first loading unit, configured to load, in response to determining the identifier information being included in the to-be-loaded kernel module, the to-be-loaded kernel module into the target kernel.

In some embodiments, the first loading unit is further configured to: perform, in response to determining the identifier information being included in the to-be-loaded kernel module, a security verification on the identifier information; and load the to-be-loaded kernel module into the target kernel if the identifier information passes the security verification.

In some embodiments, the apparatus further includes: an acquiring unit, configured to acquire a kernel module, and determine whether the kernel module satisfies a preset condition; and a generating unit, configured to generate, in response to determining the kernel module satisfying the preset condition, the identifier information in the kernel module by a default method.

In some embodiments, the preset condition includes compatibility between the kernel module and a kernel to which the kernel module is to be loaded.

In some embodiments, the apparatus further includes: a verifying unit, configured to perform, in response to determining the identifier information being excluded in the to-be-loaded kernel module, a loading verification on the to-be-loaded kernel module; and a second loading unit, configured to load the to-be-loaded kernel module into the target kernel if the to-be-loaded kernel module passes the loading verification.

In a third aspect, the present disclosure provides a server. The server includes: one or more processors; and a storage device, configured to store one or more programs. The one or more programs, when executed by the one or more processors, cause the one or more processors to implement the method for loading a kernel module in the first aspect.

In a fourth aspect, the present disclosure provides a computer readable storage medium storing a computer program. The computer program, when executed by a processor, implements the method for loading a kernel module in the first aspect.

According to the method and apparatus for loading a kernel module provided by the present disclosure, by detecting the instruction for loading the to-be-loaded kernel module into the target kernel, the information of the to-be-loaded kernel module is acquired, to determine whether the identifier information is present in the to-be-loaded kernel module. If the identifier information is present in the to-be-loaded kernel module, the to-be-loaded kernel module may be loaded into the target kernel without the loading verification of the target kernel. In this way, when different versions of kernels of the same operating system need to run the to-be-loaded kernel module, if the identifier information is included in the to-be-loaded kernel module, the to-be-loaded kernel module may be loaded into the different versions of kernels. It is conducive to improving the scope of application of the to-be-loaded kernel module.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
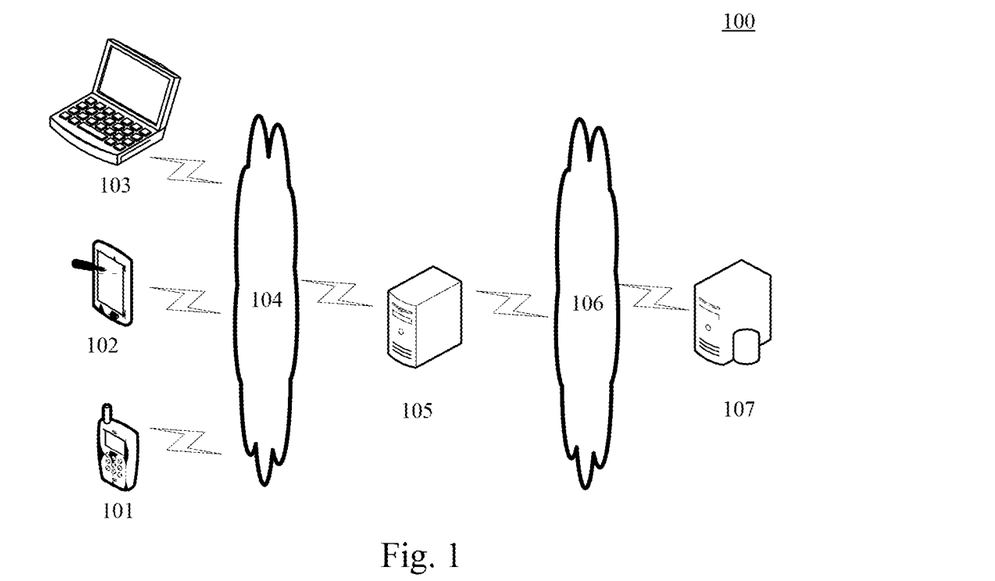
FIG. 1 is an exemplary system architecture diagram in which the present disclosure may be applied.

FIG. 1 shows an exemplary system architecture 100 of an embodiment in which a method and apparatus for loading a kernel module according to the present disclosure may be applied.

As shown in FIG. 1, the system architecture 100 may include terminal devices 101, 102 and 103, networks 104 and 106, a server 105, and a database server 107. The network 104 serves as a medium providing a communication link between the terminal devices 101, 102 and 103 and the server 105. The network 106 serves as a medium providing a communication link between the server 105 and the database server 107. The networks 104 and 106 may include various types of connections, for example, wired or wireless communication links, or optical fiber cables.

A user may use the terminal devices 101, 102 and 103 to interact with the server 105 via the network 104 to receive or send messages. Various communication client applications (e.g., web browser applications, search applications, and instant messaging tools) may be installed on the terminal devices 101, 102 and 103.

The terminal devices 101, 102 and 103 may be various electronic devices, including but not limited to, smart phones, tablet computers, e-book readers, and desktop computers.

The database server 107 may be a server that stores a set of to-be-loaded kernel modules. The server 105 may be a server providing various services, for example, a backend kernel module loading server processing an instruction for loading a to-be-loaded kernel module into a target kernel sent by the terminal devices 101, 102 and 103. After detecting the instruction, the backend kernel module loading server may acquire the to-be-loaded kernel module from the database server 107, perform a process such as an analysis on data (e.g., the to-be-loaded kernel module and the target kernel), and feed the processed result (prompting information about whether the to-be-loaded kernel module is successfully loaded) back to the terminal devices.

It should be noted that the method for loading a kernel module provided by the embodiments of the present disclosure is generally performed by the server 105. Correspondingly, the apparatus for loading a kernel module is generally provided in the server 105.

It should be appreciated that the numbers of the terminal devices, the networks, the servers, and the database servers in FIG. 1 are merely illustrative. Any number of terminal devices, networks, servers and database servers may be provided based on actual requirements. It should be noted that, in the situation where the to-be-loaded kernel module is stored in the server 105, the database server 107 may not be provided in the system architecture 100.

Figure 2:
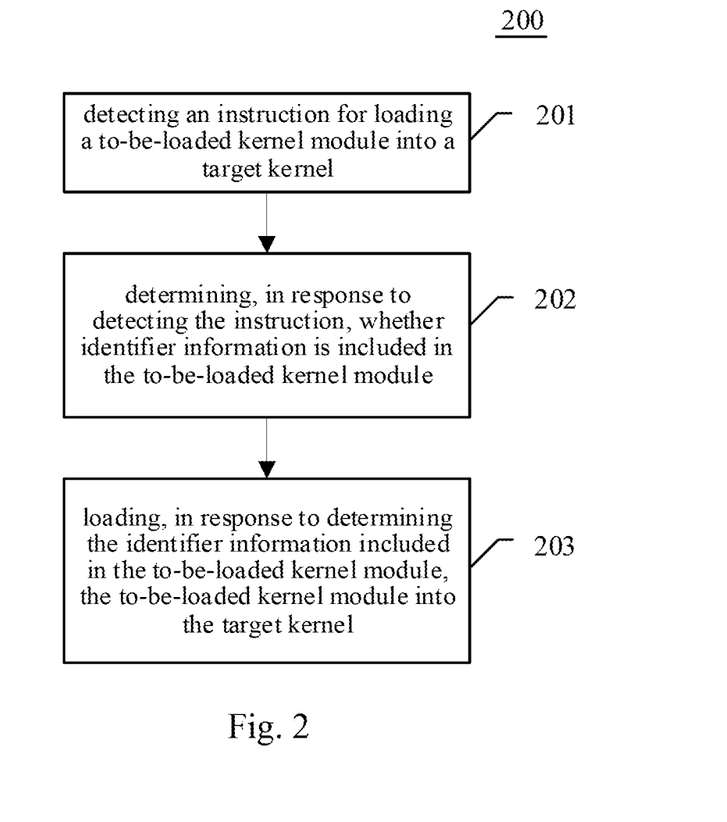
FIG. 2 is a flowchart of an embodiment of a method for loading a kernel module according to the present disclosure.

Further referring to FIG. 2, a flow 200 of an embodiment of a method for loading a kernel module according to the present disclosure is illustrated. The method includes the following steps.

Step 201 includes detecting an instruction for loading a to-be-loaded kernel module into a target kernel.

In this embodiment, an electronic device (e.g., the server 105 shown in FIG. 1) on which the method for loading a kernel module is implemented may detect and receive the instruction for loading the to-be-loaded kernel module into the target kernel from the terminal used by a user by means of a wired connection or a wireless connection. The instruction may be initiated by the user through a button (virtual button or physical button) on a touch terminal, or initiated by the user by sending a certain message to the electronic device through the terminal.

In this embodiment, the target kernel may have different versions in various operating systems. For example, the target kernel may be a kernel of a version such as NT5.1, NT5.2, NT6.0, or NT6.1 in the Windows graphical work interface operating system. The to-be-loaded kernel module may include a program that has an independent function but cannot be run independently. For example, when a new hardware device is added into the Windows operating system, the to-be-loaded kernel module may be the device driver of the hardware device. The to-be-loaded kernel module may also include an LKM (loadable kernel module) in the Linux kernel.

Step 202 includes determining, in response to detecting the instruction, whether the to-be-loaded kernel module includes identifier information.

In this embodiment, based on the instruction detected in step 201, the electronic device may first acquire the to-be-loaded kernel module indicated by the instruction, and then read the information of the to-be-loaded kernel module to determine whether the identifier information is included in the read information. The identifier information is used to represent loading the to-be-loaded kernel module into the target kernel.

In this embodiment, the instruction may include the name and/or the version number of the to-be-loaded kernel module. According to the name and/or the version number of the to-be-loaded kernel module, the electronic device may acquire a matching to-be-loaded kernel module from the database server 107 shown in FIG. 1. Alternatively, the electronic device may first locally look up whether the matching to-be-loaded kernel module is stored. If the local lookup is failed, the matching to-be-loaded kernel module is then acquired from the database server 107. It should be noted that the specific storage location of the to-be-loaded kernel module is not limited in the present disclosure.

In this embodiment, according to whether there is information irrelevant to program content in the to-be-loaded kernel module, the electronic device may determine whether the identifier information is included in the to-be-loaded kernel module. If there is the information irrelevant to the program content in the to-be-loaded kernel module, the information may be determined as the identifier information. For example, there is a "¥" before the ELF header of an ELF file.

In some alternative implementations of this embodiment, for the to-be-loaded kernel module, the electronic device may further perform matching on each piece of identifier information in a set of pre-stored identifier information. If the to-be-loaded kernel module includes information matching the identifier information in the set of identifier information, it may be determined that the identifier information is included in the to-be-loaded kernel module.

In some alternative implementations of this embodiment, the identifier information may be arbitrary, for example, a character, a character string, or a data segment. As an example, the kernel module of the Linux system is in an ELF (executable and linking format) format. Thus, the identifier information may be a separate section in the to-be-loaded kernel module, and the name thereof may be "foo," "bar," or the like. At the same time, the data in the section may be arbitrary.

Figure 5:
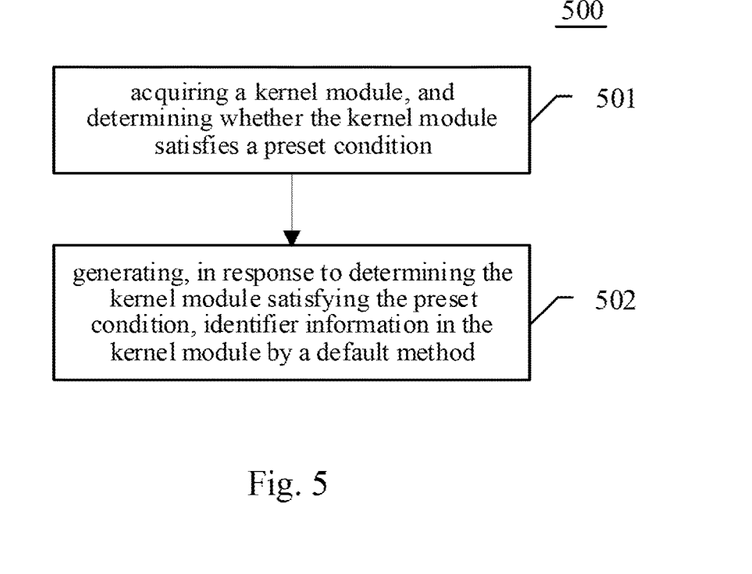
FIG. 5 is a flowchart of an embodiment of a step of generating identifier information in the method for loading a kernel module according to the present disclosure.

In some alternative implementations of this embodiment, the method for loading a kernel module may further include a step of generating the identifier information in the kernel module. Here, FIG. 5 is a flowchart of an embodiment of the step of generating the identifier information in the method for loading a kernel module according to the present disclosure. According to the flow, the electronic device may generate the identifier information in the kernel module.

Step 203 includes loading, in response to determining the identifier information being included in the to-be-loaded kernel module, the to-be-loaded kernel module into the target kernel.

In this embodiment, in response to determining the identifier information being included in the to-be-loaded kernel module in step 202, the electronic device may execute a loading program to load the to-be-loaded kernel module into the target kernel. It may be understood that the loading process of the electronic device on the to-be-loaded kernel module is not limited in the present disclosure. The loading process may be a direct loading process or a compatible loading process. For example, the electronic device may implement the loading on the to-be-loaded kernel module by installing a relevant compatibility package. In addition, it should be noted that the location of the identifier information in the to-be-loaded kernel module is not limited in the present disclosure.

In this embodiment, the operating system of the electronic device may store kernels of a plurality of versions. In this case, the instruction may further include the version number of the target kernel. The electronic device may select the target kernel according to the version number of the target kernel. In addition, the electronic device may store a plurality of operating systems, and each operating system includes kernels of a plurality of versions. In this case, the instruction may further include the name and the version number of the target kernel. The electronic device may select the target kernel according to the name and the version number of the target kernel.

Figure 3:
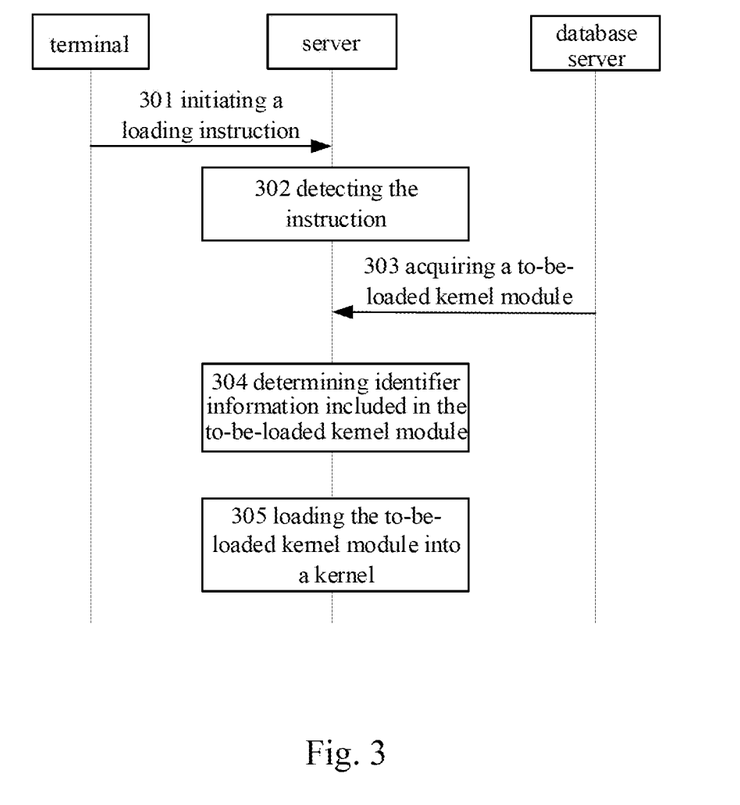
FIG. 3 is a schematic diagram of an application scenario of the method for loading a kernel module according to the present disclosure.

Further referring to FIG. 3, FIG. 3 is a schematic diagram of an application scenario of the method for loading a kernel module according to this embodiment. In the application scenario of FIG. 3, the user first initiates the instruction through the terminal, to load the to-be-loaded kernel module (LKM) named A into the Linux kernel of the version 2.6 (as illustrated by the reference numeral 301). Next, after detecting the instruction, the server may acquire the to-be-loaded kernel module (i.e., LKM "A") from the database server (as illustrated by the reference numeral 303), and find the data segment of the special name "_attribute_((section("bar")))" in the to-be-loaded kernel module to determine that the identifier information is included in LKM "A" (as illustrated by the reference numeral 304). Then, the server starts the "insmod" command and invokes the "init_module" function to start loading LKM "A" to the Linux kernel of the 2.6 version (as illustrated by the reference numeral 305).

In the method provided by the foregoing embodiment of the present disclosure, whether the identifier information is included in the to-be-loaded kernel module is determined, and the to-be-loaded kernel module having the identifier information is loaded into the target kernel. Accordingly, it is implemented that the to-be-loaded kernel module may be loaded to the target kernel without a loading verification, which reduces the repeated compilations or modifications on the to-be-loaded kernel module due to many versions of target kernels. Accordingly, the scope of application of the to-be-loaded kernel module in different versions of target kernels of the same operating system is expanded, which is conducive to reducing the maintenance cost.

Figure 4:
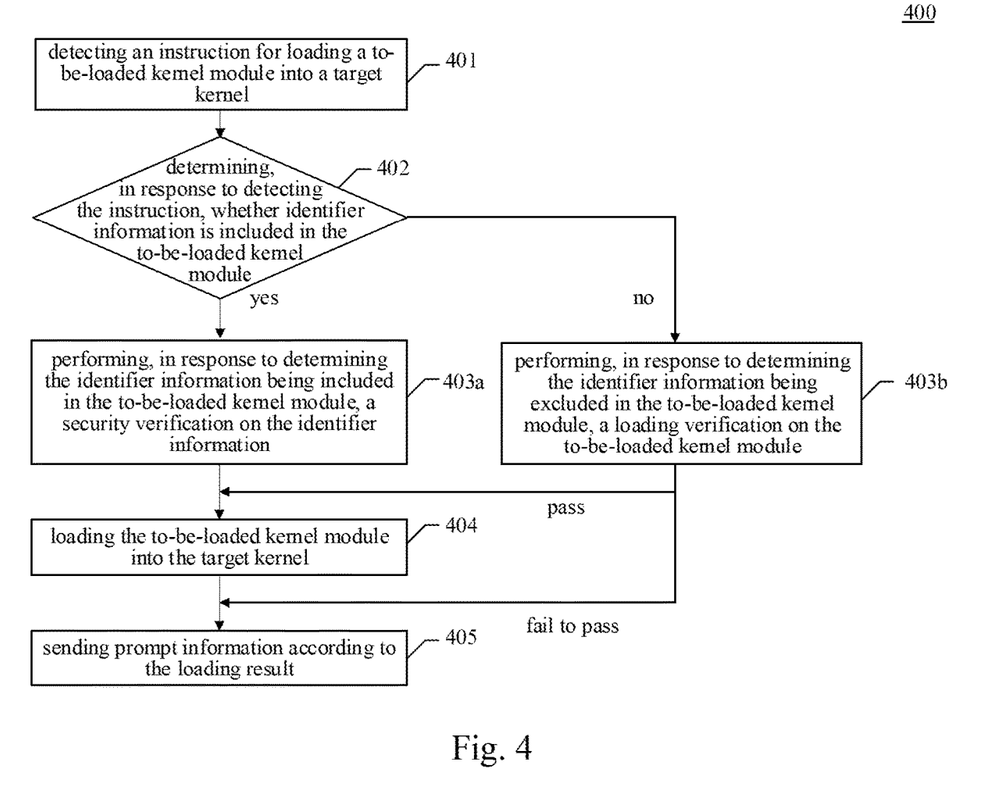
FIG. 4 is a flowchart of another embodiment of the method for loading a kernel module according to the present disclosure.

Further referring to FIG. 4, FIG. 4 illustrates a flow 400 of another embodiment of the method for loading a kernel module. The flow 400 of the method includes the following steps.

Step 401 includes detecting an instruction for loading a to-be-loaded kernel module into a target kernel.

In this embodiment, an electronic device (e.g., the server 105 shown in FIG. 1) on which the method for loading a kernel module is implemented may detect the instruction for loading the to-be-loaded kernel module into the target kernel, the instruction being sent by a user through a terminal device.

Step 402 includes determining, in response to detecting the instruction, whether identifier information is included in the to-be-loaded kernel module.

In this embodiment, after detecting the instruction, the electronic device may acquire the information of the to-be-loaded kernel module, and determine whether the identifier information is included in the to-be-loaded kernel module. The identifier information is used to represent loading to-be-loaded kernel module into the target kernel. If the identifier information is included in the to-be-loaded kernel module, step 403*a* is performed. If the identifier information is not included in the to-be-loaded kernel module, step 403*b* is performed.

Step 403*a* includes performing, in response to determining the identifier information being included in the to-be-loaded kernel module, a security verification on the identifier information.

In this embodiment, after determining that the identifier information is included in the to-be-loaded kernel module, the electronic device may perform the security verification on the identifier information. For example, antivirus software is started to detect and kill a virus on the identifier information. If there is no virus in the identifier information, the identifier information passes the security verification. In addition, the identifier information may further include information for indicating the source of the identifier information, for example, the designation (name) or the number of the unit, the department or the individual that compiles the identifier information. In this case, the electronic device may match the source of the identifier information with source information in a set of pre-stored source information. If the matching is successful, the identifier information passes the security verification. If the identifier information passes the security verification, step 404 is performed Step 403*b* includes performing, in response to determining the identifier information being excluded in the to-be-loaded kernel module, a loading verification on the to-be-loaded kernel module.

In this embodiment, after determining that the identifier information is not included in the to-be-loaded kernel module, the electronic device may start a loading verification program to perform the loading verification on the to-be-loaded kernel module. The information of the loading verification includes, but is not limited to, the kernel version of the to-be-loaded kernel module, and CRC. The loading verification here is the same as the verification mechanism of loading the kernel module in the existing technology, which will not be repeatedly described here. If the to-be-loaded kernel module passes the loading verification, step 404 is performed. If the to-be-loaded kernel module fails to pass the loading verification, step 405 is performed.

Step 404 includes loading the to-be-loaded kernel module into the target kernel.

In this embodiment, the electronic device may load the to-be-loaded kernel module into the target kernel, so that the target kernel executes a program in the to-be-loaded kernel module. This is the same as the process of loading the kernel module in the existing technology, which will not be repeatedly described here.

Step 405 includes sending prompt information according to the loading result.

In this embodiment, according to the loading result of the to-be-loaded kernel module, the electronic device may send the prompt information to the terminal used by the user by means of a wired connection or a wireless connection. If the to-be-loaded kernel module is loaded into the target kernel, prompt information indicating that the loading is successful is sent. If the to-be-loaded kernel module fails to pass the loading verification, prompt information indicating that the loading is failed is sent.

It may be seen from FIG. 4 that, as compared with the embodiment corresponding to FIG. 2, the flow 400 of the method for loading a kernel module in this embodiment emphasizes the step of performing the security verification on the identifier information, and the step of performing the loading verification when the identifier information is not included in the to-be-loaded kernel module. Therefore, the scheme described in this embodiment may implement a more comprehensive and complete kernel module loading process. While improving the applicability of the kernel module, it is conducive to reducing the maintenance cost for the system, and is also conducive to improving the security in the kernel module loading process.

Further referring to FIG. 5, FIG. 5 illustrates a flow 500 of an embodiment of a step of generating identifier information in a kernel module. The step includes the following steps.

Step 501 includes acquiring the kernel module, and determining whether the kernel module satisfies a preset condition.

In this embodiment, the electronic device (e.g., the server 105 shown in FIG. 1) may first acquire the kernel module locally or from the database server 107. Then, the electronic device determines whether the kernel module satisfies the preset condition. Here, the preset condition may include compatibility between the kernel module and a kernel to which the kernel module is to be loaded. As an example, if the function, the data structure, and the like included in the kernel module A are all supported by the kernel B, it may be determined that the kernel module A satisfies the preset condition.

Step 502, generating, in response to determining the kernel module satisfying the preset condition, the identifier information in the kernel module by a default method.

In this embodiment, after determining that the kernel module satisfies the preset condition, the electronic device may generate the identifier information in the kernel module by the default method. For example, information is added to the kernel module by compiling an instruction, to generate the identifier information. Alternatively, information in the kernel module is modified using a write tool, to generate the identifier information.

In this embodiment, the identifier information generated each time may be identical or different. As an example, the identifier information may correspond to an operating system to which the kernel module is applicable. For example, the identifier information corresponding to the kernel module applicable to the Windows operating system is 1, and the identifier information corresponding to the kernel module applicable to the Linux operating system is 2, which facilitates classification and management for kernel modules.

In the embodiment shown in FIG. 5, by screening the kernel modules, the kernel module that satisfies the preset condition is selected, which avoids generating the identifier information for each kernel module. At the same time, by generating the identifier information in the kernel module that satisfies the preset condition, it may be implemented that the kernel module may be loaded into different versions of kernels of the same operating system by performing only one compilation or modification on the kernel module. Thus, the number of compilations or modifications on the kernel module is reduced, which is further conducive to expanding the scope of application of the kernel module.

Figure 6:
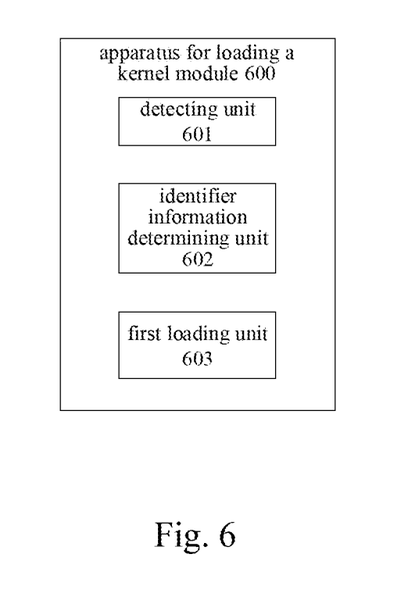
FIG. 6 is a schematic structural diagram of an embodiment of an apparatus for loading a kernel module according to the present disclosure.

Further referring to FIG. 6, as an implementation of the method shown in the above drawings, the present disclosure provides an embodiment of an apparatus for loading a kernel module. The embodiment of the apparatus corresponds to the embodiment of the method shown in FIG. 2, and the apparatus may be applied in various electronic devices.

As shown in FIG. 6, the apparatus 600 for loading a kernel module in this embodiment includes: a detecting unit 601, an identifier information determining unit 602, and a first loading unit 603. The detecting unit 601 is configured to detect an instruction for loading a to-be-loaded kernel module into a target kernel. The identifier information determining unit 602 is configured to determine, in response to detecting the instruction, whether identifier information is included in the to-be-loaded kernel module, the identifier information being used to represent loading the to-be-loaded kernel module into the target kernel. The first loading unit 603 is configured to load, in response to determining the identifier information being included in the to-be-loaded kernel module, the to-be-loaded kernel module into the target kernel.

In this embodiment, for specific processes of the detecting unit 601, the identifier information determining unit 602, and the first loading unit 603, and their technical effects, reference may be made to relative descriptions of corresponding step 201, step 202, and step 203 in the embodiment of FIG. 2 respectively, which will not be repeatedly described here.

In some alternative implementations of this embodiment, the first loading unit is further configured to: perform, in response to determining the identifier information being included in the to-be-loaded kernel module, a security verification on the identifier information; and load the to-be-loaded kernel module into the target kernel if the identifier information passes the security verification.

In some alternative implementations of this embodiment, the apparatus 600 may further include: an acquiring unit (not shown), configured to acquire a kernel module, and determine whether the kernel module satisfies a preset condition; and a generating unit (not shown), configured to generate, in response to determining the kernel module satisfying the preset condition, the identifier information in the kernel module by a default method.

In some alternative implementations of this embodiment, the preset condition includes compatibility between the kernel module and a kernel to which the kernel module is to be loaded.

In some alternative implementations of this embodiment, the apparatus 600 may further include: a verifying unit (not shown), configured to perform, in response to determining the identifier information being excluded in the to-be-loaded kernel module, a loading verification on the to-be-loaded kernel module; and a second loading unit (not shown), configured to load the to-be-loaded kernel module into the target kernel if the to-be-loaded kernel module passes the loading verification.

Figure 7:
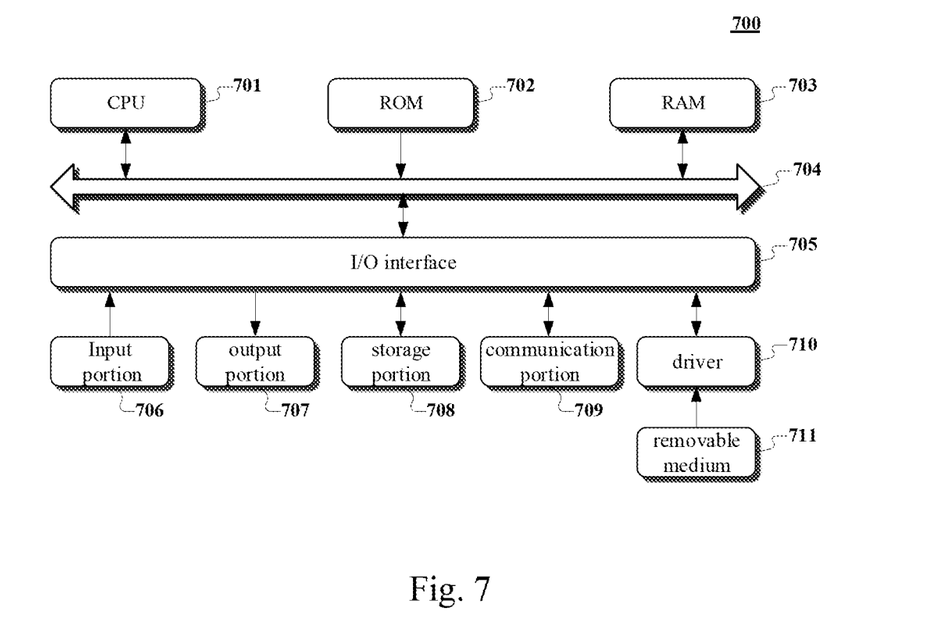
FIG. 7 is a schematic structural diagram of a computer system adapted to implement a server according to the embodiments of the present disclosure.

Referring to FIG. 7, FIG. 7 illustrates a schematic structural diagram of a computer system 700 adapted to implement a server of the embodiments of the present disclosure. The server shown in FIG. 7 is merely an example and should not impose any restriction on the function and scope of use of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 further stores various programs and data required by operations of the system 700. The CPU 701, the ROM 702 and the RAM 703 are connected to each other via a bus 704. An input/output (I/O) interface 705 is also connected to the bus 704.

The following components are connected to the I/O interface 705: an input portion 706 including a keyboard, a mouse. etc.; an output portion 707 including a cathode ray tube (CRT), a liquid crystal display device (LCD), a speaker, etc.; a storage portion 708 including a hard disk and the like; and a communication portion 709 including a network interface card, for example, a LAN card and a modem. The communication portion 709 performs communication processes via a network such as the Internet. A driver 710 is also connected to the I/O interface 705 as required. A removable medium 711, for example, a magnetic disk, an optical disk, a magneto-optical disk, and a semiconductor memory, may be installed on the driver 710, to facilitate the installation of a computer program from the removable medium 711 on the storage portion 708 as needed.

In particular, according to embodiments of the present disclosure, the process described above with reference to the flowchart may be implemented in a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 709, and/or may be installed from the removable medium 711. The computer program, when executed by the central processing unit (CPU) 701, implements the above mentioned functionalities as defined by the method of the present disclosure. It should be noted that the computer readable medium in the present disclosure may be a computer readable signal medium, a computer readable storage medium, or any combination of the two. For example, the computer readable storage medium may include, but not limited to: an electronic, magnetic, optical, electromagnetic, infrared, or semiconductor system, apparatus, or element, or any combination of the above. A more specific example of the computer readable storage medium may include, but not limited to: electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as apart of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

The flowcharts and block diagrams in the accompanying drawings illustrate architectures, functions and operations that may be implemented according to the method, the apparatus, and the computer program product of the various embodiments of the present disclosure. In this regard, each of the blocks in the flow charts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units or modules involved in the embodiments of the present disclosure may be implemented by means of software or hardware. The described units or modules may also be provided in a processor, for example, described as: a processor, comprising a detecting unit, an identifier information determining unit, and a first loading unit. The names of these units do not in some cases constitute a limitation to such units themselves. For example, the detecting unit may also be described as "a unit for detecting an instruction for loading a to-be-loaded kernel module into a target kernel."

In another aspect, the present disclosure further provides a computer-readable medium. The computer-readable medium may be the computer-readable medium included in the server described in the above embodiments, or a stand-alone computer-readable medium not assembled into the server. The computer-readable medium stores one or more programs. The one or more programs, when executed by the server, cause the server to: detect an instruction for loading a to-be-loaded kernel module into a target kernel; determine, in response to detecting the instruction, whether identifier information is included in the to-be-loaded kernel module, the identifier information being used to represent loading the to-be-loaded kernel module into the target kernel; and load, in response to determining the identifier information being included in the to-be-loaded kernel module, the to-be-loaded kernel module into the target kernel.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for loading a kernel module, comprising:
  acquiring the kernel module, and determining whether the kernel module satisfies a preset condition, wherein the preset condition includes compatibility between the kernel module and a kernel to which the kernel module is to be loaded;
  determining the kernel module being compatible with the kernel;
  adding, in response to determining the kernel module being compatible with the kernel, identifier information to a separate section of the kernel module;
  detecting an instruction for loading a to-be-loaded kernel module into a target kernel;
  determining, in response to detecting the instruction, whether the identifier information is included in the to-be-loaded kernel module, the identifier information being used to represent loading the to-be-loaded kernel module into the target kernel, wherein the to-be-loaded kernel module is in an ELF (executable and linking format) format;
  detecting the identifier information located in the separate section of the to-be-loaded kernel module, the identifier information being irrelevant with all other sections of the to-be-loaded kernel module, wherein the detecting comprises detecting a character in the separate section before an ELF header of an ELF file, the character being irrelevant with the ELF file; and
  loading, in response to detecting the identifier information in the separate section of the to-be-loaded kernel module, the to-be-loaded kernel module into the target kernel, wherein the loading comprises loading, in response to detecting the character in the separate section before the ELF header of the ELF file, the to-be-loaded kernel module into the target kernel.

2. The method according to claim 1, wherein the loading, in response to determining the identifier information being included in the to-be-loaded kernel module, the to-be-loaded kernel module into the target kernel comprises:
  performing, in response to determining the identifier information being included in the to-be-loaded kernel module, a security verification on the identifier information; and
  loading the to-be-loaded kernel module into the target kernel if the identifier information passes the security verification.

3. The method according to claim 1, further comprising:
  performing, in response to determining the identifier information being excluded in the to-be-loaded kernel module, a loading verification on the to-be-loaded kernel module; and
  loading the to-be-loaded kernel module into the target kernel if the to-be-loaded kernel module passes the loading verification.

4. An apparatus for loading a kernel module, comprising:
  at least one processor; and
  a memory storing instructions, wherein the instructions when executed by the at least one processor, cause the at least one processor to perform operations, the operations comprising:
    acquiring the kernel module, and determining whether the kernel module satisfies a preset condition, wherein the preset condition includes compatibility between the kernel module and a kernel to which the kernel module is to be loaded;
    determining the kernel module being compatible with the kernel;
    adding, in response to determining the kernel module being compatible with the kernel, identifier information to a separate section of the kernel module;

detecting an instruction for loading a to-be-loaded kernel module into a target kernel;

determining, in response to detecting the instruction, whether the identifier information is included in the to-be-loaded kernel module, the identifier information being used to represent loading the to-be-loaded kernel module into the target kernel, wherein the to-be-loaded kernel module is in an ELF (executable and linking format) format;

detecting the identifier information located in the separate section of the to-be-loaded kernel module, the identifier information being irrelevant with all other sections of the to-be-loaded kernel module, wherein the detecting comprises detecting a character in the separate section before an ELF header of an ELF file, the character being irrelevant with the ELF file; and loading, in response to detecting the identifier information in the separate section of the to-be-loaded kernel module, the to-be-loaded kernel module into the target kernel, wherein the loading comprises loading, in response to detecting the character in the separate section before the ELF header of the ELF file, the to-be-loaded kernel module into the target kernel.

5. The apparatus according to claim 4, wherein the loading, in response to determining the identifier information being included in the to-be-loaded kernel module, the to-be-loaded kernel module into the target kernel comprises:

performing, in response to determining the identifier information being included in the to-be-loaded kernel module, a security verification on the identifier information; and loading the to-be-loaded kernel module into the target kernel if the identifier information passes the security verification.

6. The apparatus according to claim 4, wherein the operations further comprise generating the identifier information in the kernel module, wherein the generating the identifier information in the kernel module comprises:

acquiring the kernel module, and determine whether the kernel module satisfies a preset condition; and generating, in response to determining the kernel module satisfying the preset condition, the identifier information in the kernel module by a default method.

7. The apparatus according to claim 6, wherein the preset condition includes compatibility between the kernel module and a kernel to which the kernel module is to be loaded.

8. The apparatus according to claim 4, wherein the operations further comprise:

performing, in response to determining the identifier information being excluded in the to-be-loaded kernel module, a loading verification on the to-be-loaded kernel module; and loading the to-be-loaded kernel module into the target kernel if the to-be-loaded kernel module passes the loading verification.

9. A non-transitory computer readable storage medium, storing a computer program, wherein the computer program, when executed by a processor, causes the processor to perform operations, the operations comprising:

acquiring the kernel module, and determining whether the kernel module satisfies a preset condition, wherein the preset condition includes compatibility between the kernel module and a kernel to which the kernel module is to be loaded;

determining the kernel module being compatible with the kernel;

adding, in response to determining the kernel module being compatible with the kernel, identifier information to a separate section of the kernel module;

detecting an instruction for loading a to-be-loaded kernel module into a target kernel;

determining, in response to detecting the instruction, whether the identifier information is included in the to-be-loaded kernel module, the identifier information being used to represent loading the to-be-loaded kernel module into the target kernel, wherein the to-be-loaded kernel module is in an ELF (executable and linking format) format;

detecting the identifier information located in the separate section of the to-be-loaded kernel module, the identifier information being irrelevant with all other sections of the to-be-loaded kernel module, wherein the detecting comprises detecting a character in the separate section before an ELF header of an ELF file, the character being irrelevant with the ELF file; and loading, in response to detecting the identifier information in the separate section of the to-be-loaded kernel module, the to-be-loaded kernel module into the target kernel, wherein the loading comprises loading, in response to detecting the character in the separate section before the ELF header of the ELF file, the to-be-loaded kernel module into the target kernel.

* * * * *